United States Patent [19]

Sasaki

[11] Patent Number: 6,044,386

[45] Date of Patent: *Mar. 28, 2000

[54] INFORMATION PROCESSING APPARATUS AND DATA INPUT METHOD USED THEREIN

[75] Inventor: Toyoshige Sasaki, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/547,194

[22] Filed: Oct. 24, 1995

[30] Foreign Application Priority Data

Oct. 25, 1994 [JP] Japan .................................. 6-260051

[51] Int. Cl.$^7$ .................................................. G06F 17/21
[52] U.S. Cl. ........................................... 707/531; 345/340
[58] Field of Search .................................. 395/766, 768, 395/347, 340; 707/500, 505, 507, 530, 531; 345/347, 340, 335, 443

[56] References Cited

U.S. PATENT DOCUMENTS

| | | | |
|---|---|---|---|
| 4,809,170 | 2/1989 | Leblang et al. ........................ | 364/200 |
| 4,827,404 | 5/1989 | Barstow et al. ..................... | 345/952 X |
| 4,956,773 | 9/1990 | Saito et al. .......................... | 345/967 X |
| 5,247,651 | 9/1993 | Clarisse .................................... | 395/500 |
| 5,504,902 | 4/1996 | McGrath et al. ....................... | 345/326 |
| 5,508,909 | 4/1996 | Maxwell et al. ........................ | 364/147 |
| 5,555,367 | 9/1996 | Premerlani et al. ................ | 345/967 X |
| 5,588,103 | 12/1996 | Aoyagi .................................... | 345/326 |
| 5,594,858 | 1/1997 | Blevins .................................... | 345/326 |
| 5,721,959 | 2/1998 | Nakamura et al. ................ | 345/967 X |

OTHER PUBLICATIONS

LeBlond et al., dBase IV The Complete Reference, 1989, p.517–533,604–607,708–711, 1989.

*Primary Examiner*—Joseph H. Feild
*Attorney, Agent, or Firm*—Fitzpatrick, Cella, Harper & Scinto

[57] ABSTRACT

An information processing apparatus which provides improved user interfacing. Upon the inputting of model data, data-input windows and item information input into the windows are displayed, and parameters input in the displayed data-input windows are converted into text data and stored into a memory. The text data includes a plurality of instructions having parameter's input in the data-input windows. As the stored text data is read and execution is designated, the instructions described in the text data are sequentially executed. Further, it is possible to change the instruction included in the text data. Further, the instructions described by the text data may be changed by reading the text data and displaying the read text data on a display screen and changing the parameters of the instruction. Otherwise, an instruction may be added to the text data by reading the text data and displaying the read text data on the display screen and adding additional instructions to the text data.

14 Claims, 9 Drawing Sheets

DISPLAYED IMAGE FOR REGISTRATION OF INSTRUCTION

DISPLAYED IMAGE FOR EDITING AND EXECUTING REGISTERED INSTRUCTION

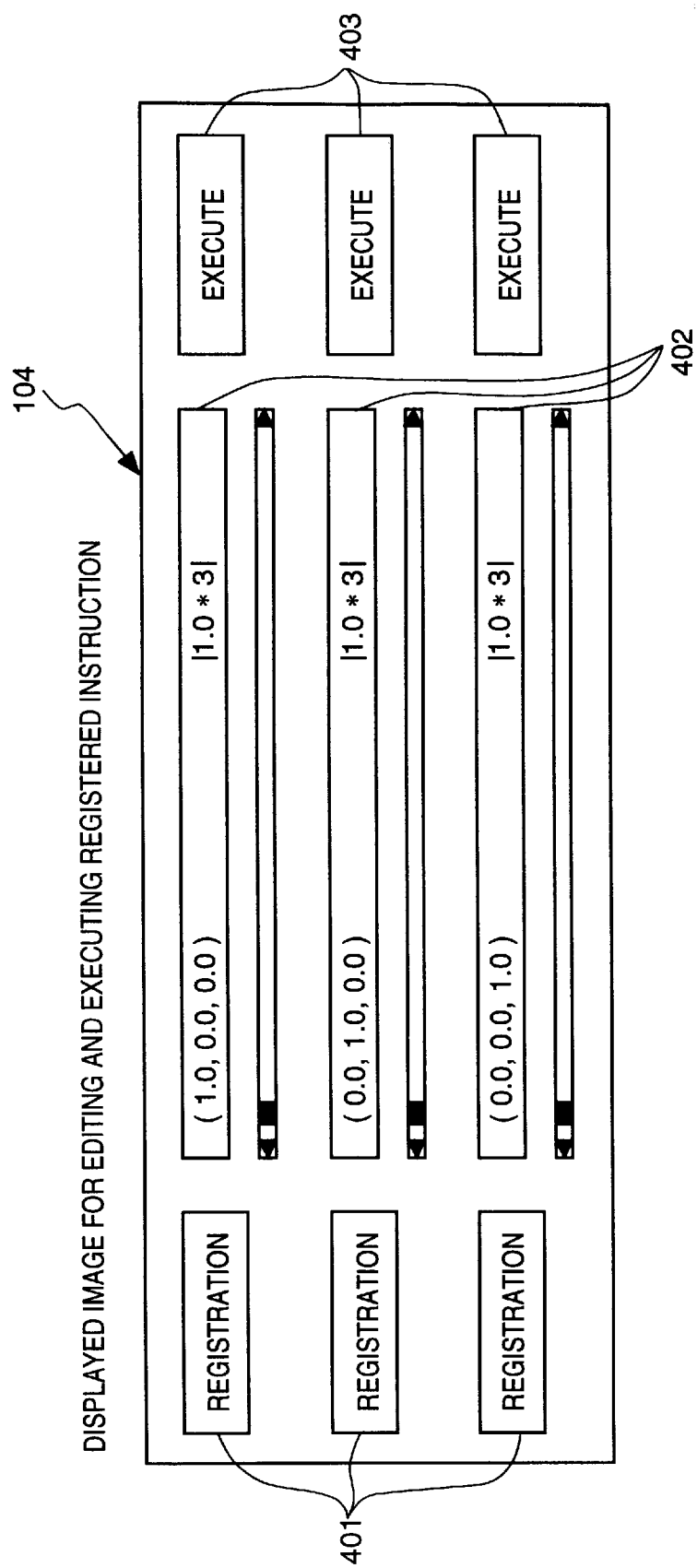

DISPLAYED IMAGE FOR REGISTRATION OF INSTRUCTION (NEW REGISTRATION MODE)

DISPLAYED IMAGE FOR REGISTRATION OF INSTRUCTION (ADDITIONAL REGISTRATION MODE)

DISPLAYED IMAGE FOR EDITING AND EXECUTING REGISTERED INSTRUCTION

NODAL POINT → LINE ELEMENTS

LINE ELEMENTS → SHELL ELEMENTS

SHELL ELEMENTS → SOLID ELEMENT

FIG. 9

INPUT DATA FOR BATCH PROCESSING (1.0, 0.0, 0.0)    |1.0 * 3|

(0.0, 1.0, 0.0)    |1.0 * 3|

(0.0, 0.0, 1.0)    |1.0 * 3|

INFORMATION PROCESSING APPARATUS AND DATA INPUT METHOD USED THEREIN

BACKGROUND OF THE INVENTION

This invention relates to an information processing apparatus for inputting various data and designating processing based on the input data, and a data input method used in the apparatus.

Recently, numerical experiments, including finite element methods and finite difference methods, have come to be widely used as a means for designing numerical models, in response to the development of computer devices. The significance of such numerical experiments increases from year to year. In such experiments, models are partitioned into minute elements and used as partitioning models (element-partitioning models). In use of these partitioning models, it is important that an operator can easily perform processings to generate elements and nodal points (points connecting elements), and otherwise change or delete attributes of the elements. To provide such environment, various input-output devices (pre-post processors) are developed.

Generally, windows systems are used on these computer devices to provide operators with a friendly environment (man-machine interface) for interactive processing. For example, in a UNIX system, X-window is often used. Further, to develop a programs using the X-window, libraries such as Motif and OPEN LOOK are provided. Program developers use these libraries to easily generate and arrange menus, switches, buttons and the like for controlling programs.

These devices receive an instruction inputted by an operator and perform processing in accordance with the instruction. Methods for processing the instruction are classified into two types of methods: batch processing type methods and interactive processing type methods. In the case of batch processing, a group of input instructions is stored in a memory as file data, which has been generally formed by using a text editor or the like. That is, the plurality of instructions are stored in the file data. Then, the file data is read and interpreted as instructions, and then the instructions are sequentially executed. The features of the batch processing are that a plurality of processings are sequentially executed in the order of the instructions stored in the file data, and that once processing based on the instructions is started, the operator cannot interfere with the processing until the processings based on all the instructions are completed.

On the contrary, in the case of interactive processing, an operator gives an instruction directly to a computer device, and the computer device executes processing based on the input instruction on the spot. That is, the device repeats execution of processing based on an input instruction until all of processings required by the operator are completed.

Further, these two types of processings will be described in detail with reference to an example where a partitioning models is generated by extending nodal points or elements.

FIGS. 8A to 8C are explanatory views showing a model-generating process. In these figures, points P0 to P3 are nodal points represented with "X" (note that "X" is omitted from FIG. 8C except at P0). Reference numerals E1 to E3 denote elements. First, as shown in FIG. 8A, the nodal point P0 is extended in the x-direction, and the line element E1 is obtained. The point P1 is a nodal point constructing the line element E1. At this time, the length of extension (referred to as "extension pitch") is "d1". The extension is made thrice in FIG. 8A. Next, as shown in FIG. 8B, the line element E1 is extended with an extension pitch "d2" thrice in the y-direction, and a shell element E2 is obtained. The nodal point P2 is a nodal point occurred with the shell element E2. Finally, as shown in FIG. 8C, the shell element E2 is extended with an extension pitch "d3" thrice in the z-direction, and a partitioning model E3 constituted with 9 solid elements is obtained.

Next, a case where this partitioning model is generated by using a batch-processing type device will be described.

FIG. 9 shows an example of file data. An operator makes the file data using a text editor or the like, prior to starting processing.

The processing comprises the x-directional extension of the nodal point P0, the y-directional extension of the line element E1 and the z-directional extension of the shell element E2. The file data comprises three line data corresponding to these three steps. In each of the line data, the bracketed three values represent a vector indicating the desired extension direction (x,y,z). In the following barred (i.e., between bars "|") expression, the former value ("1.0" here) represents an extension pitch, and the latter value ("3" here), the number of times of the extensions. The asterisk (*) between the two values means an extension (multiplication).

As the computer device receives the file data as batch data, the device reads the file data, and after all the data has been read, performs batch processing to execute these three (three lines) instructions sequentially. As a result, the partitioning model shown in FIG. 8C is obtained.

Next, in a case where the above partitioning model is generated by using an interactive processing type device, an operator instructs the device to perform extension with the extension pitch "1.0" thrice in the x-direction. The device executes the extension according to the instruction. When the execution is completed, the operator then instructs the device to perform an extension with the extension pitch "1.0" thrice in the y-direction. Then the device performs the extension in the y-direction in response to the instruction. Similarly, the operator instructs the device to perform an extension in the z-direction. Thus, the partitioning model shown in FIG. 8C is obtained.

The procedures of generating a partitioning model, by extending nodal points or elements of figure(s), using the conventional input-output devices are as described above. Note that these procedures are not limited to generation of partitioning models, but similar processes are used for correcting partitioning models, setting of attributes of nodal points or elements.

However, the conventional instruction execution methods using the conventional input-output devices have problems as follows.

<Batch Processing>

In this processing, as described above, instruction (input data) is generally input and made by using a text editor. For this reason, the forming of an instruction requires time and labor. In addition, upon forming an instruction, errors such as typing errors often occur, and thus the work of forming the instruction may include correction of the errors, which prolongs the time of input operation. In this manner, poor user interfacing lowers operability, operation efficiency and reliability of user operation.

Further, since formed instructions are all executed by batch processing, it is impossible to review a processed result at a midway point of processing and determine whether or not the following processing is to be changed. This causes difficulties in complicated processing.

<Interactive Processing>

In this processing, instructions are sequentially input and executed; however, instructions are not stored as records. For this reason, even if an instruction similar to a previously-executed instruction is retried, the same instruction must be input again. For example, in a case where the partitioning model shown in FIGS. 8A to 8C is generated, even if only the number of times in the z-directional extension is changed to four times, the same input operations which starts the designation of the x-directional extension shown in FIG. 8A, must be repeated again.

To solve the above problems, a device which stores all the instructions inputted in interactive-processing as a text file and executes the stored instructions in batch processing is provided (here such file is referred to as "restart file"). In this device, after interactive processing, a part of stored restart file is edited (in FIG. 8C, if the number of z-directional extensions is changed, a value in a restart file corresponding to the number of z-directional extensions is changed) to change the number of extension times in the z-direction, and thereafter, the restart file is executed in batch processing. This easily attains execution of similar processings without repeating input of the same instruction.

Actually, since a restart file itself has a considerably large amount of data, operators seldom use this restart-file function. Generally, in an interactive-processing type system, an operator makes trials and errors during input. The input instructions may include many wasteful instructions (instructions executed but deleted afterwards). However, such trial-and-error instructions are all recorded in the above-mentioned restart file. Accordingly, the contents of the restart file become very long, and correction of the file contents costs the operator immense difficulty. Therefore, the operator avoids correcting a restart file, but repeats operation in interactive processing.

Another means for compensating the above drawback is a function to store some of the input instructions, beginning from the latest one, in a memory, and arbitrarily read them for editing and execution (referred to as "instruction history function"). For example, in FIG. 8A, if the number of times of x-directional extensions is changed, the instruction corresponding to the number of times of x-directional extensions inputted in interactive processing is read, corrected, and executed; similarly, the instruction of y- and z-directional extensions may be read and re-executed. However, this method is effective in simple processing, but not practical in complicated processing.

In this method, data on extending direction, extension pitch and number of times of extensions are sequentially provided; however, these data are stored in the memory independently. Accordingly, even if only the number of times of extensions is changed, reading is done thrice (regarding extending direction, extension pitch and number of extensions). Further, since these data respectively have no meaning as independent data (e.g., vector data has no meaning when only the data is read), as the desired processing becomes longer and more complicated, operations for reading and editing become complicated. In a case where a desired instruction is given by utilizing this method, the processing time is prolonged.

As described above, the conventional input-output devices have a lot of problems in a user interface to execute similar processings repeatedly, and thus operability, operation efficiency and operation reliability are low.

SUMMARY OF THE INVENTION

The present invention has been made in consideration of the above prior art, and has its object to provide an information processing apparatus which improves the ability of a user interface, and a data input method used in the apparatus.

Another object of the present invention is to provide an information processing apparatus which changes an original processing instruction and easily executes a modified instruction similar to the original instruction, and a data input method used in the apparatus.

Another object of the present invention is to provide an information processing apparatus which easily generates instruction to be executed based on an already-existing text data, and a data input method used in the apparatus.

Another object of the present invention is to provide an information processing apparatus which easily adds instructions to an already-existing group of instructions, and a data input method used in the apparatus.

Another object of the present invention is to provide an information processing apparatus which allows an operator to set numeric values, and execute instructions while confirming input items, and a data input method used in the apparatus.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates a display screen image for editing and executing a registered instruction according to a second embodiment of the present invention;

FIG. 9 shows an example of input data for batch processing.

DETAILED DESCRIPTION OF THE PREFERRED EMBODIMENTS

The preferred embodiments of the present invention will now be described in detail in accordance with the accompanying drawings.

[First Embodiment]

Figure 1:
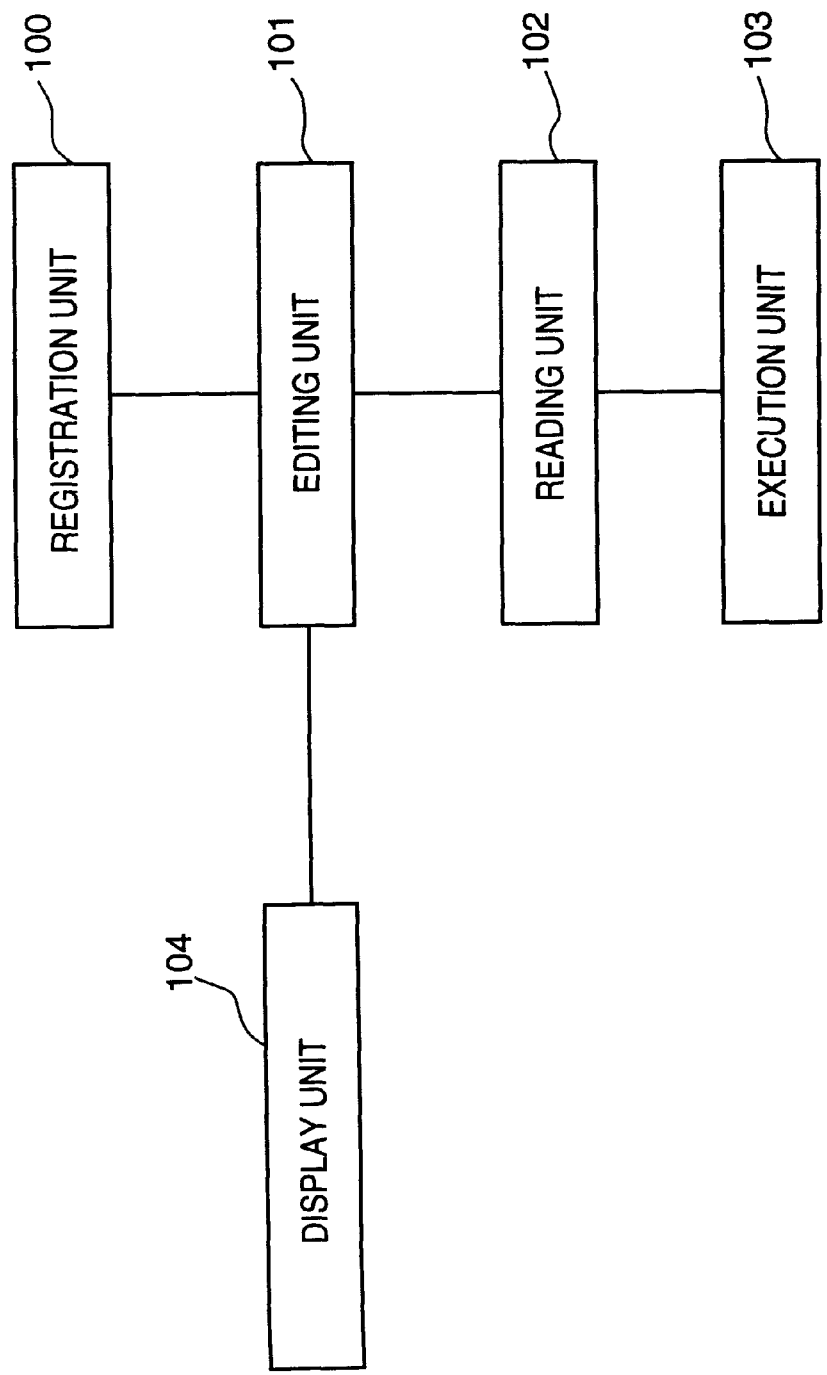
FIG. 1 is a block diagram showing the functional construction of a data input apparatus according to a first embodiment of the present invention.

FIG. 1 is a block diagram showing the functional construction of a data input apparatus according to a first embodiment of the present invention.

In FIG. 1, reference numeral 100 denotes a registration unit which receives an instruction (command) including parameters input by an operator (analyzer), converts the instruction into text data and outputs the text data to an editing unit 101. The editing unit 101 displays data on an editing screen (a screen on the display unit 104) based on the command. Note that the instruction input by the operator is a series of information for performing some processing with respect to an analysis model. The operation of converting the instruction (command) into text data and displaying the text data by the editing unit 101 on the display unit 104, is referred to as "registration". The editing unit 101 has function for editing the instruction displayed on the screen of the display unit 104. Numeral 102 denotes a reading unit which reads the content of the text data displayed on the editing screen of the display unit 104 and outputs the read text data to an execution unit 103. Note that the text data displayed on the editing screen remains after the reading unit 102 has read it. The execution unit 103 interprets the text data from the reading unit 102, and executes the instruction included in the text data.

Figure 2:
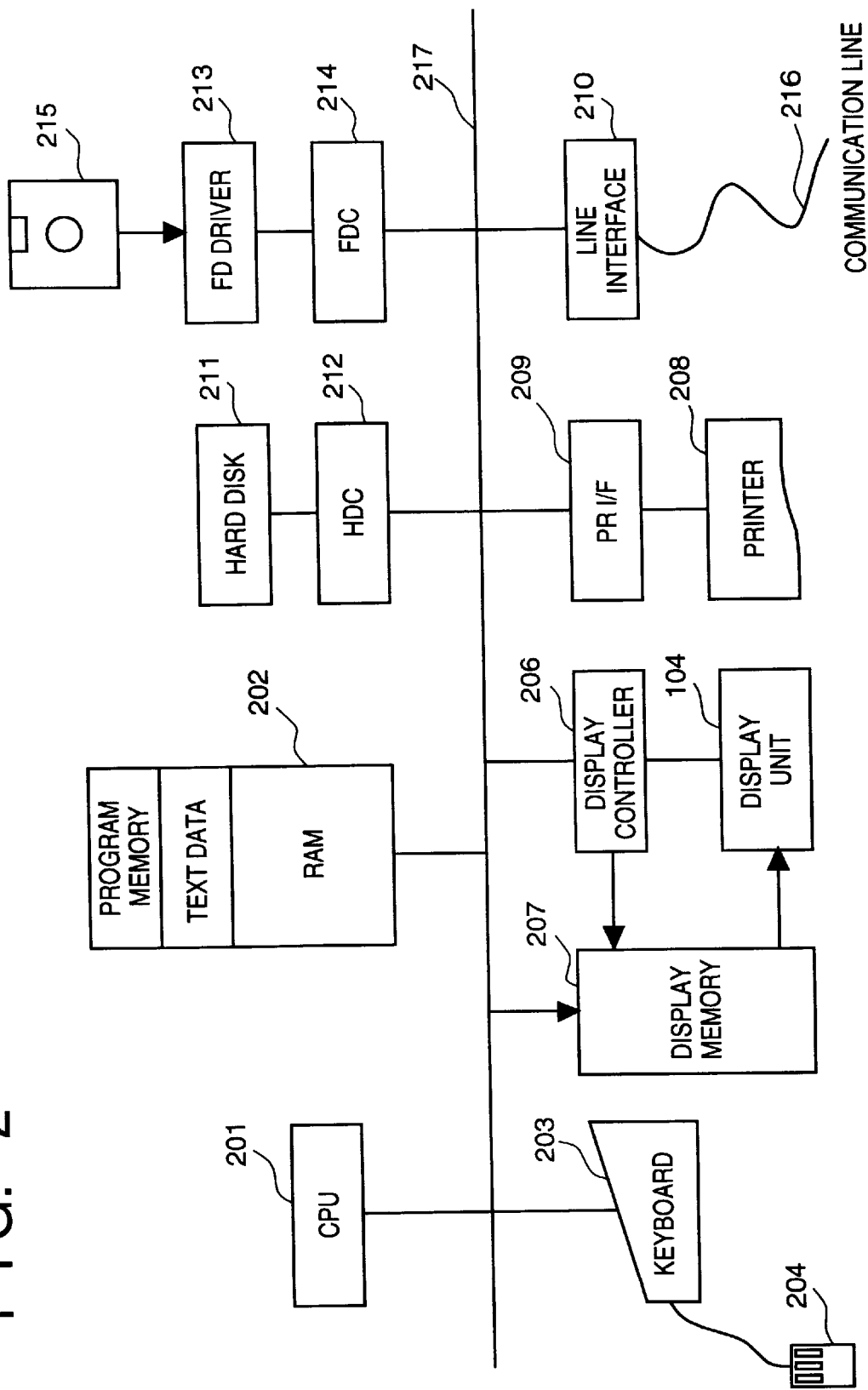
FIG. 2 is a block diagram showing the construction of the data input apparatus of the first embodiment.

FIG. 2 is a block diagram showing the construction of the data input apparatus of the present embodiment. In FIG. 2, numeral 201 denotes a CPU which controls the operation of the overall apparatus in accordance with a control program stored in a program memory of a RAM 202; 203, a keyboard operated by an operator, having alphanumeric keys, etc., for inputting an extending direction, an extension pitch (to be described later) and the like; and 204, a pointing device such as a mouse. The pointing device 204 is used to move a cursor on the screen of the display unit 104, to mark a "register" button 505 or an "execute" button 512 to be described later. A command corresponding to a designated button, is inputted by "clicking" of a button on the pointing device 204. The display unit 104 comprises, e.g., a CRT or a liquid crystal, and it displays pattern data stored in a display memory 207 under the control of a display controller 206. Numeral 208 denotes a printer, connected via a printer interface (PR I/F) 209, for printing images based on the above-described text data, and line elements, shell elements and solid elements generated in accordance with instructions included in the text data. Numeral 210 denotes a line interface which performs communication with another apparatus via a communication line 216.

Numeral 211 denotes a hard disk in which various application programs executed by the CPU 201 and text data generated in the aforementioned operation and the like are stored; 212, a controller (HDC) which controls writing/reading to/from the hard disk 211; and 213, a floppy disk driver which performs writing/reading data to/from a floppy disk 215 under the control of a controller (FDC) 214. Note that the control program stored in the program memory of the RAM 202 may be read from the hard disk 211 or the floppy disk 215 and loaded there. The text data in the RAM 202 may be generated by the above-described operation or may be transferred from the hard disk 211 or the floppy disk 215 as already-stored data.

Next, processing procedure of the data input apparatus of the first embodiment will be described with reference to the flowchart of FIG. 3. Note that a control program for executing this processing is stored in the program memory of the RAM 202.

In this embodiment, an operator first displays a menu of instructions on the screen of the display unit 104. If designation of the registration of the instruction is made at steps S1, then the program proceeds to step S2. In step S2, the registration processing of the selected instruction including input parameters of the instruction is made by the registration unit 100. After the registration, the operator edits the displayed text data, using the editing unit 101, in accordance with necessity (steps S3 and S4). If this is the first execution of instruction and if it is considered that a desired instruction is registered, then it is not necessary to edit the text data. As the editing is completed, the process proceeds to step S5, at which whether or not an instruction to start execution of processing has been inputted by the operator is examined. If it is determined that the execution of processing has been instructed, the process proceeds to step S6, at which the reading unit 102 reads the text data displayed on the screen of the display unit 104 into the RAM 202, and transfers the command based on the text data to the execution unit 103 (step S7). Thus, the execution unit 103 receives the command and starts the processing corresponding to the content of the command.

In a case where a text data including instructions having desired parameters is first registered and executed, processing is made as described above.

Next, a subsequent processing procedure where already-registered text file is edited and the instructions of the edited text file are executed, will be described below.

First, after the execution of the already-registered text file, when another instructions utterly different from the instruction stored the text file are added and executed, the registration is newly performed. At step S8, if "register instruction" is selected, then the process returns to step S1 to perform the registration as described above.

If desired instructions similar to most of the instructions in the already-registered text file are performed, "edit registered instruction" is selected at step S8, and the process proceeds to step S3. In this case, as most of the desired instructions are already registered (displayed) as a text file, it is not necessary to start from the registration at step S1. At step S3, in the text data displayed on the screen of the display unit 104, necessary portion(s) is only corrected using function(s) of the editing unit 101 (steps S3 and S4). When the displayed text data has been changed to text data for performing desired processing, start of the performing of instructions is initiated at step S5. Thus, the edited processing is performed at steps S6 and S7.

Next, an example of an operation in a case where a partitioning model is generated by extending nodal point(s) and element(s) (line and the like) displayed on the screen will be described with reference to FIGS. 4A and 4B.

Figure 4A:
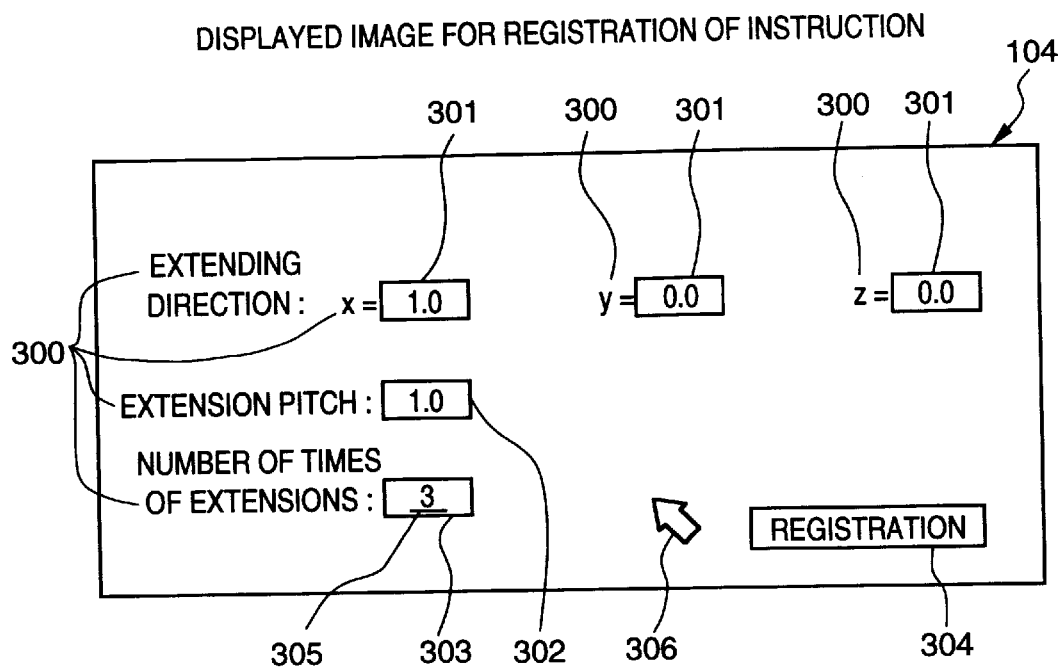
FIGS. 4A and 4B illustrate display images for registration and execution of instruction of the data input apparatus of the first embodiment.

FIG. 4A shows a display image (window) for registering an instruction with parameters input by an operator, formed by using, e.g., X-window and Motif. Display images shown in FIGS. 4B, 5 and 6A through 6C are formed in the same manner.

In FIG. 4A, numeral 300 denotes label widgets which are displayed as character array as explanation of adjacent data input window; 301, parameter input windows generated with a text widget, respectively for inputting a vector component of an extending direction by a numerical value; 302 and 303, parameter input windows of a text widget respectively for inputting an extension pitch and a number of times of extensions; 304, a push-button widget for designate to "registration". This display image is made by a function of the registration unit 100. An operator generates an instruction by inputting parameters and registers it while referring to this displayed image displayed on the display unit 104. Numeral 306 denotes a mouse cursor which moves on the screen in accordance with the operation of the mouse 204.

Figure 4B:
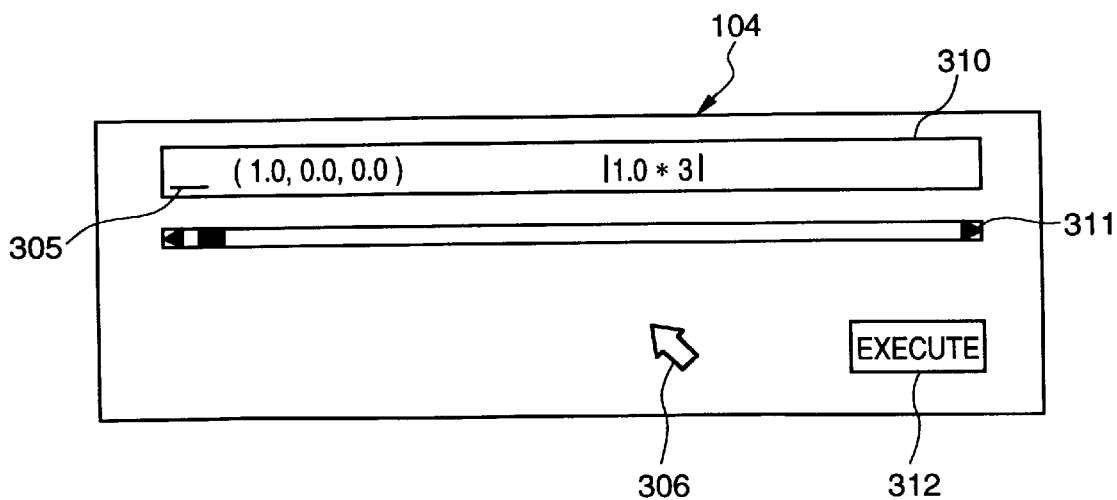

FIG. 4B shows a display image for editing of the instruction, and executing the edited instruction.

In FIG. 4B, numeral 305 denotes a cursor which indicates a character input position on the screen of the display unit 104. Numeral 310 denotes a text widget at which the parameters of the registered instruction are displayed as text data. Note that the text widget 310 may be displayed in single-line mode and multi-lines mode, but must be in editable mode. Numeral 311 denotes a scroll bar accompanying the text widget 310. By scrolling this scroll bar 311, the content of the text widget 310 is scrolled in left and right directions. The text widget 310 corresponds to an editing screen image of the display unit 104 displayed by a function of the editing unit 101. Numeral 312 denotes a push-button widget for instructing "execute".

Next, processing procedure where the operator generates a partitioning model while referring to the above display image will be described below.

Figure 3:
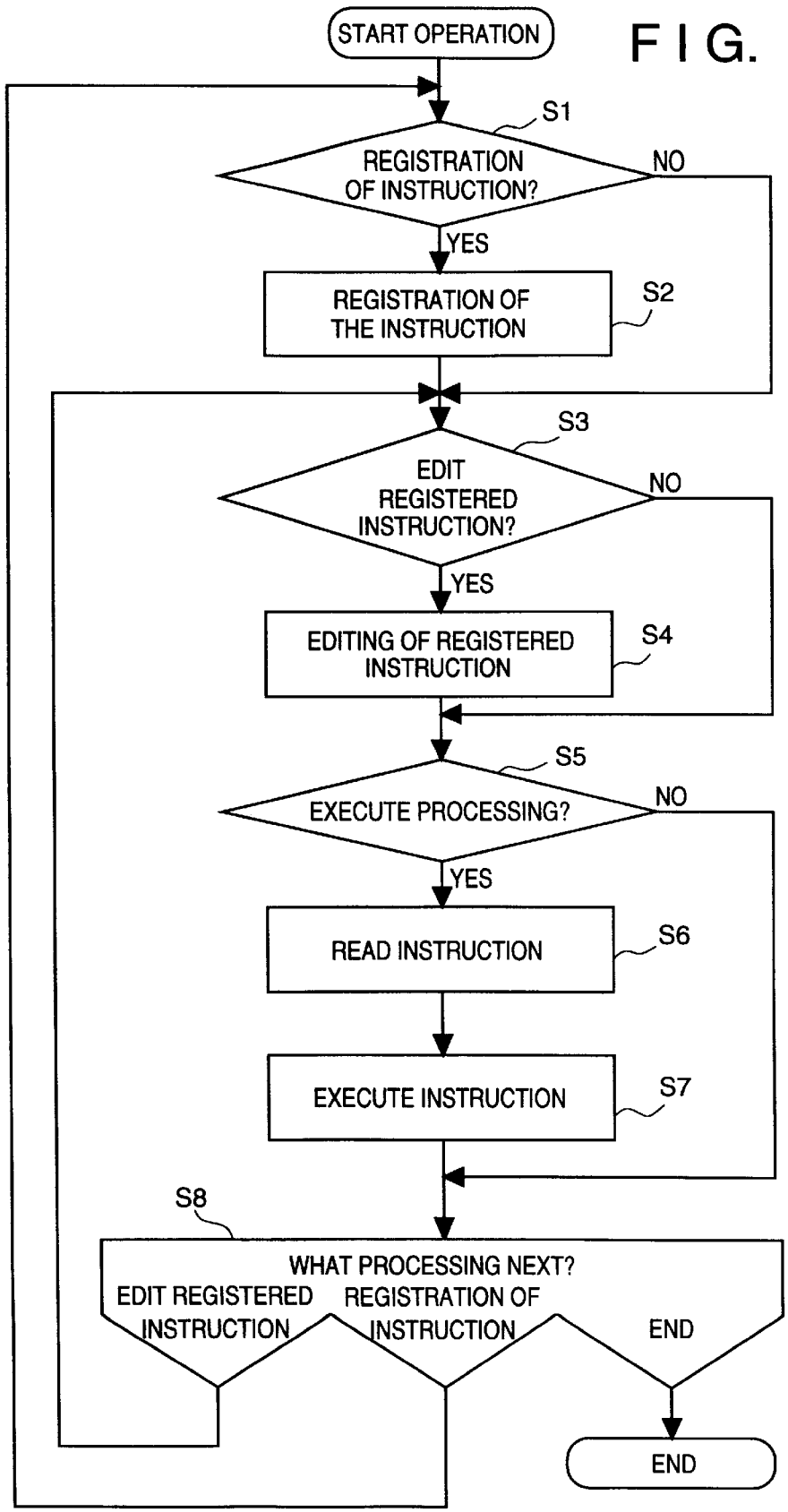
FIG. 3 is a flowchart showing processing for registration and execution of instruction in the data input apparatus of the first embodiment.

(1) Registration of Instruction (Steps S1 and S2 in FIG. 3).

The operator designates the text widgets 301, 302 and 303 with the mouse cursor 306, and sets the parameters of the instruction to be performed. That is, as extension with the extension pitch "1.0" in the x-direction is performed thrice, the extension pitch "1.0" and the number of times of extensions "3" are inputted as shown in FIG. 4A. As all the numerical parameters have been set, the mouse cursor 306 is moved to the position of the "registration" button 304, and the mouse 204 is clicked. Then the data input apparatus of this embodiment reads the numerical values set in the text widgets 301 to 303 and stores the numerical data as parameters of the instruction, into a text data of the RAM 202. This function to read numerical values set on the display image is provided as a function unique to text widgets of the Motif.

Thus, as all the numerical values (parameters) have been read, the values are converted into one-dimensional character array (stream data) as follows:

(1.0, 0.0, 0.0)|1.0*3|

Note that in practice, any format may be used as the format of the one-dimensional character array. However, in this example, the format is the same as that of the input data in batch processing shown in FIG. 9.

As the conversion has been completed, the apparatus of this embodiment displays the one-dimensional character array in the text widget 310 (editing screen image: display unit 104) as shown in FIG. 4B. Display of the one-dimensional character array in the text widget 310 is also provided as a function unique to text widgets of the Motif. Then the operator terminates the registration of instruction.

(2) Editing of Registered Instruction (Steps S3 and S4 in FIG. 3)

Next, the operator corrects the parameters displayed on the editing screen in accordance with necessity. Note that the editing function is unique to the text widgets, and only using a text widget displayed on the editing screen satisfies the specification as the editing function.

(3) Execution of Instruction (Steps S5 to S7 in FIG. 3)

As the editing has been completed at step S4, the operator designates the "execute" push-button 312 and clicks the mouse 204. Then the apparatus first reads the edited text data (stored in the RAM 202) displayed in the text widget 310 by the reading unit 102. The function of the reading unit 102 is realized by utilizing one function of the text widgets to reading displayed data as one-dimensional character array. As reading of the text data has been completed, the apparatus forwards the read one-dimensional character array to the execution unit 103. The execution unit 103 receives the one-dimensional character array, reads the content of parameters of the instruction from the character array, and performs processing corresponding to the content. Note that this technique of converting text data into one-dimensional character array and performing processing read from the character array has been provided by the conventional batch-processing type input-output devices, therefore, there is no problem when this is used in practice.

(4) Execution of Similar Instructions to the registered instructions (Steps S8→S3 to S7 in FIG. 3)

To execute the instructions to perform extension with the extension pitch "1.0" in the y-direction thrice, basically the operations (1) to (3) may be performed. However, the y-directional extension is very similar to the x-directional extension made by the operations of the above-mentioned items (1) to (3). Accordingly, the "edit the registered instruction" is designated at step S8, then the operation is started at step S3. That is, in the text data displayed on the editing screen shown in FIG. 4A, data indicative of the extending direction is only changed from the x-direction to the y-direction as follows:

(0.0, 1.0, 0.0)|1.0*3|

After the parameters indicative of the extension pitch in x and y- direction have been changed, as the "execute" button 312 is clicked, the y-directional extension is performed by the processing of the above-mentioned item (3).

As the y-directional extension has been completed, by the same way, the extension pitch in z-direction is designated and the displayed text data is changed to:

(0.0, 0.0, 1.0)|1.0*3| then the "execute" button 312 is clicked, to perform the z-directional extension. Thus, the partitioning model comprising solid elements can be obtained.

As apparent from the above description, the conventional interactive-processing type data input-output devices divide one instruction into some parts and sequentially input the parts (e.g., as one extension operation, an extending direction, an extension pitch and a number of times of extensions are sequentially inputted), while the data input apparatus of the present embodiment uses a registration image (as shown in FIG. 4A) to input (register) a plurality of parameters at once. That is, in a case where an instruction comprises a plurality of parameters (items of data), the instruction can be input in a parameter unit designating a similar function and converted into a text file. Thus, when an operator wants to use an instruction similar to an already-registered instruction, the operator can easily modify parameters of the registered instruction and execute the modified instruction.

In this embodiment, an instruction is first registered and then executed. However, as it is apparent from the above description, text data displayed on the editing screen and registered, and text data after editing of the text data displayed on the editing screen are independent of each other. Accordingly, an instruction and parameters of an instruction may be directly input on the editing screen in a predetermined format without registration. It is rather convenient and effective for a skilled operator to directly input an instruction or parameters and then execute the input instruction than first register an instruction and execute the registered instruction.

In this manner, according to the present embodiment, like conventional interactive processing, it is possible to provide an instruction having parameters and directly execute the instruction.

Figure 8A:
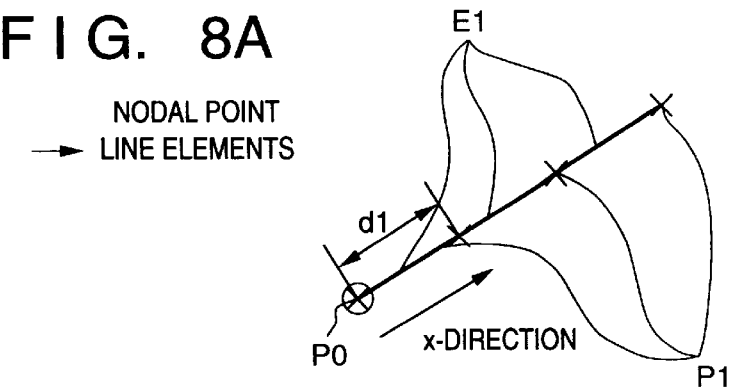
FIGS. 8A to 8C are explanatory views showing extension from a nodal point to a line element, from the line element to a shell element, and from the shell element to solid elements.
Figure 8B:
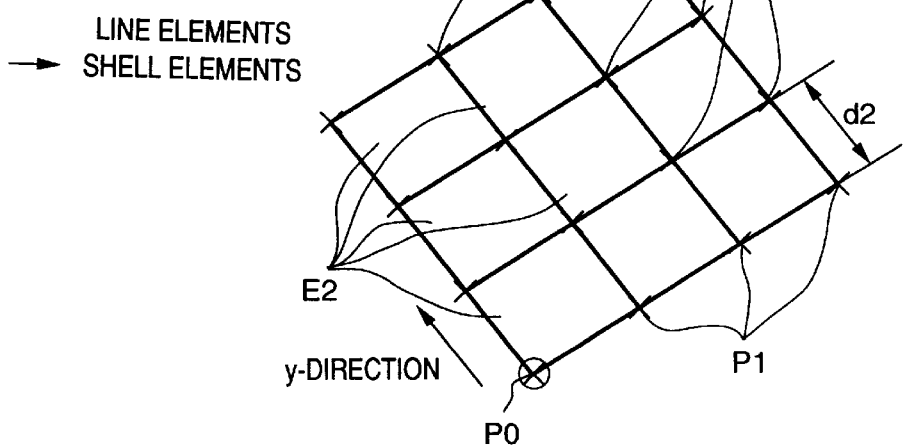
Figure 8C:
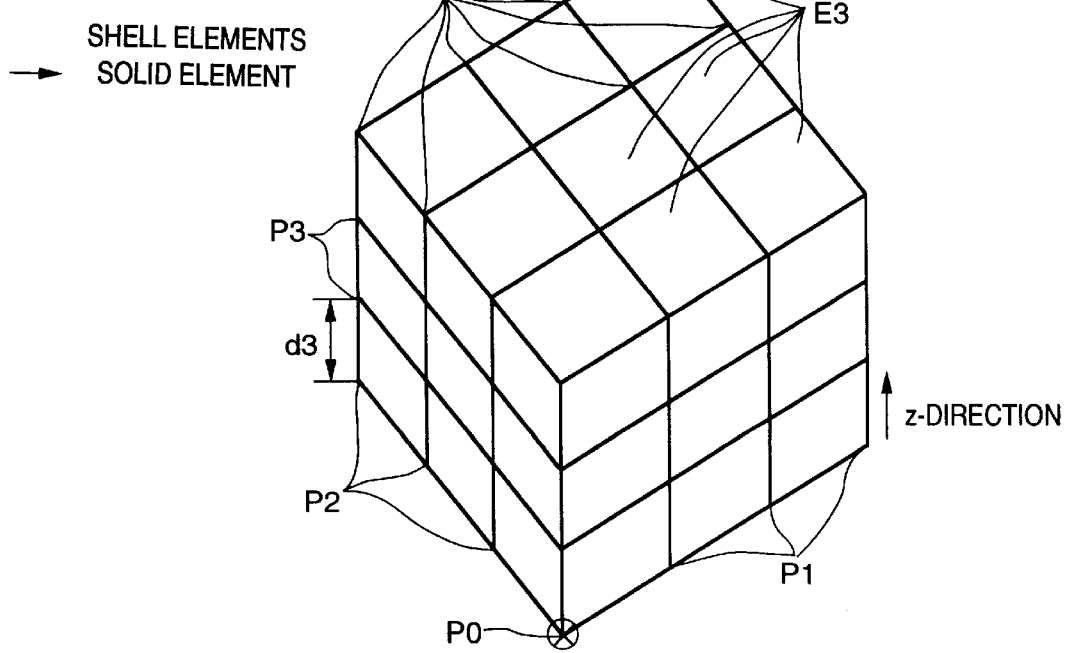

The procedures in a case where a partitioning model is generated by extending nodal point(s) or element(s) using the data input apparatus of this embodiment is as described above. Note that the instruction execution method using the construction of the present apparatus is not limited to generation of a partitioning model as shown in FIGS. 8A to 8C, but is applicable to correction of a partitioning model, setting of attributes of nodal point or element, etc., and is further applicable to general input-output processings.

Further, the present embodiment has been made with an example using UNIX windows system; however, there are many systems substituting the windows system, and any of these systems may be employed.

[Second Embodiment]

In the first embodiment, the registration unit 100 and the editing unit 101 constructing the data input apparatus are independent units. However, in this construction, when an instruction similar to an already-registered instruction is executed, it is necessary to display the text data including the instruction on the editing screen for correction. For example, when a third model similar to the already generated model is desired to be generated, it is necessary to repeat correction of the text data. In the first embodiment, after the partitioning model in FIGS. 8A to 8C has been obtained, if another model is generated by performing the similar y- and z-directional extensions but by changing the number of times of the x-directional extension to four, the vector of extending direction must be corrected again and the "execute," button 312 must be designated again.

Then, the second embodiment provides a plurality of registration units and a plurality of editing units so as to generate two or more similar models without repeating editing operation.

FIG. 5 shows a display screen image (window) for editing and executing a registered instruction according to the second embodiment of the present invention. In FIG. 5, the number of the registration units as described in the first embodiment is three, and that of the editing units as in the first embodiment is also three.

In FIG. 5, numeral 401 denote "registration" push-button widgets. As these buttons are designated, the image as shown in FIG. 4A for registration instruction are displayed. Upon editing, as shown in FIG. 5, the respective push-buttons 401 (upper, middle, lower) are accompanied with editing windows (text widgets) 402 and corresponding execution buttons 403. Note that the "registration" buttons 401, the read registration image, the editing windows 402 and the execution buttons 403, as one group, have the same functions as those of the editing screen and the buttons as described in the first embodiment.

Next, the procedure for generating the partitioning model in FIGS. 8C using the data input apparatus according to the second embodiment will be described.

<Generation of First Partitioning Model>

The operator designates the upper "registration" button 401 to pop-up display the registration screen as shown in FIG. 4A. Similarly to the first embodiment, the operator makes settings the parameters to perform the x-directional extension with the extension pitch "1.0" thrice, then presses the "registration" button 304. Thereafter, the apparatus of the second embodiment displays the instruction as text data in the upper editing window 402 in FIG. 5. As the operator designates the upper "execute" button 403, the line element in FIG. 8A (E1) is generated.

Next, the y-direction extension is designated and made using the middle "registration" button 401 and the corresponding editing window and buttons. The operation for this extension is similar to that in x-direction extension as described above. At last, the lower "registration" button 403 and the corresponding editing window and buttons, the z-directional extension is made in a similar manner. Thus the partitioning model in FIG. 8C is obtained.

Note that the extensions in the respective directions are made after registration of the instruction. However, it may be arranged such that instructions with respect to the three dimensions are first registered and then executions of the instructions are made.

Next, a procedure for a partitioning model similar to the generated partitioning model will be described. In generating the second model, the number of times of x-directional extensions is changed from three to four.

<Generation of Similar Partitioning Model>

After the first partitioning model has generated, text data are displayed in the respective editing widows. To change the number of times of x-directional extensions to "four", the upper parameters are changed as follows:

(1.0, 0.0, 0.0)|1.0*4|

After this change, as the upper "execute" button 403 is clicked, the x-directional extensions are performed four times. As the y- and z-directional extensions are the same as the previous extensions, the middle and lower "execute" buttons 403 are successively designated. Thus, a partitioning model by four times of x-directional extensions, three times of y-directional extensions and three times of z-directional extensions which have been made is obtained, and the newly generated partitioning model is different from the original model (FIG. 8C) in the number of times of x-direction extensions. In this manner, similar partitioning models are very simply generated.

As described above, the plurality of registration units 100, the plurality of execution units having functions of the editing unit 101 increase the number of instructions and the number of parameters of an instruction to be registered and edited at once. As a result, a series of instructions is easily re-executed. Note that in this embodiment, the initially registered numbers of times of x-, y- and z-directional extensions are all stored and re-executed, however, generally, only necessary instruction may be stored and undesired instruction may be deleted, then a new instruction may be additionally registered. This means that the conventional interactive-processing type input-output devices held all instructions or some of them from the latest one in the order of inputting, while the data input apparatus of this embodiment holds only desired instructions. Note that in this embodiment, the description is made in a case where a plurality of similar partitioning models are generated, however, the apparatus of the second embodiment can be adopted to input instructions for various processings.

[Third Embodiment]

In the above two embodiments, one processing is performed with respect to one registered instruction. For example, regarding the registration of the x-directional extension, one set of extension pitch and the number of times of extensions is performed. However, according to a third embodiment, the number of processings with respect to one registered instruction is not limited to one, but a plurality of processings can be performed in accordance with one instruction.

Figure 6A:
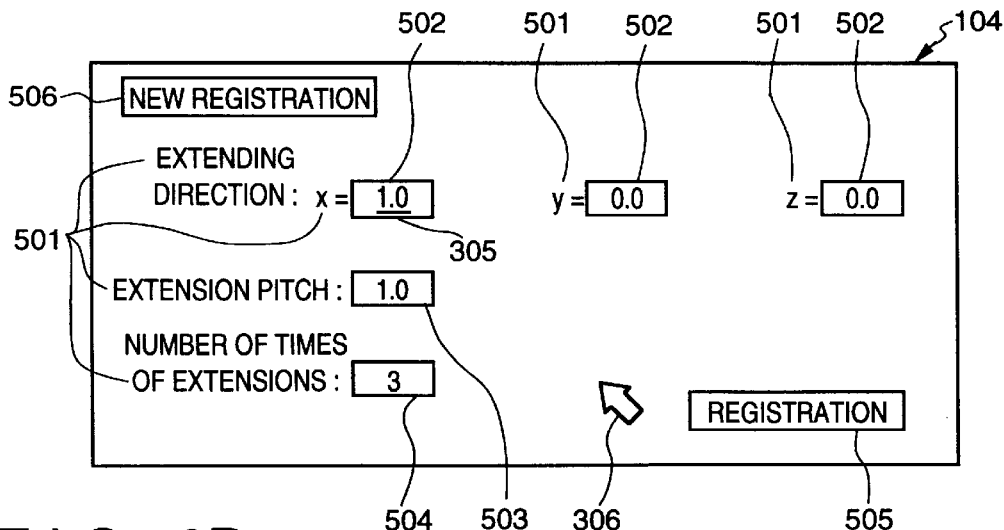
FIGS. 6A to 6C illustrate display screen images for registration and execution of instruction of a data input apparatus according to a third embodiment of the present invention.
Figure 6B:
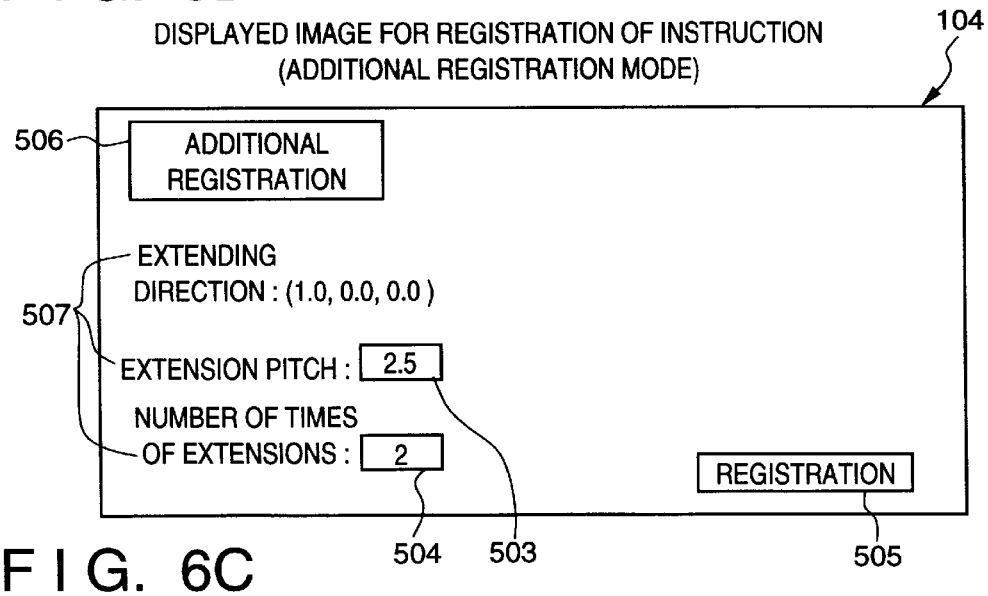
Figure 6C:
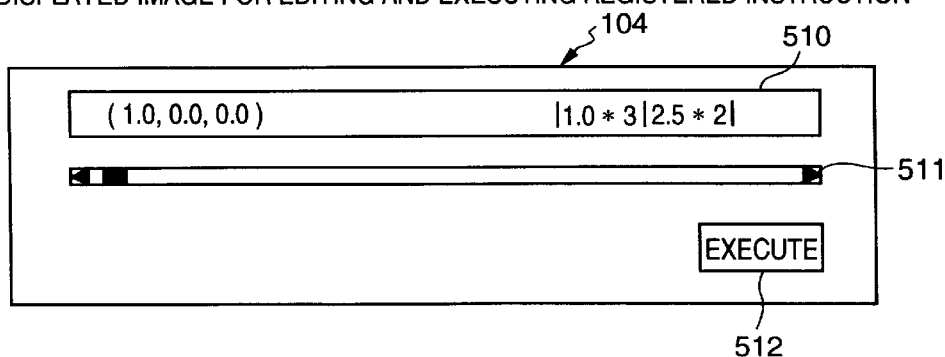

FIGS. 6A to 6C are show display screen images for registration of instruction and execution of an instruction of a data input apparatus according to the third embodiment of the present invention. FIGS. 6A and 6B are examples of display screen images for registration of instruction and additional registration of instruction, and are a little different from FIG. 4A.

In FIGS. 6A and 6B, numeral 501 denotes label widgets similar to the label widgets 300 in FIG. 4A; and 502 to 504, text widgets similar to the text widgets 302 and 303 in FIG. 4A. Numeral 505 denotes the "registration" button similar to the button 304 in FIG. 4A. As these elements 501 to 505 have similar functions of those of elements 301 to 304 in FIG. 4A, explanations of these elements will be omitted. Numeral 506 denotes a button widget as a toggle button for switching "new registration" and "additional registration". In FIG. 6B, numeral 507 denotes label widgets. In the third embodiment, the registration screen is changed by designating the button 506 as shown in FIGS. 6A and 6B. Note that this setting is realized by generating these widgets with Motif. In case of "new registration", a screen image for registering a new instruction shown in FIG. 6A is displayed with the toggle button 506, while in case of "additional registration", a screen image for adding an instruction to already-registered instruction(s) shown in FIG. 6B is displayed with the toggle button 506. Note that the label widgets 507 indicate information of parameters to be added to the already-registered instruction(s).

FIG. 6C shows a display screen image for editing and executing the registered instruction. This image is similar to that shown in FIG. 4B described in the first embodiment. That is, numeral 510 denotes an editing window similar to the text widget 310 in FIG. 4B; 511, a scroll bar similar to the scroll bar 311 in FIG. 4B; and 512, an "execute" button similar to the "execute" button 312 in FIG. 4B.

Figure 7:
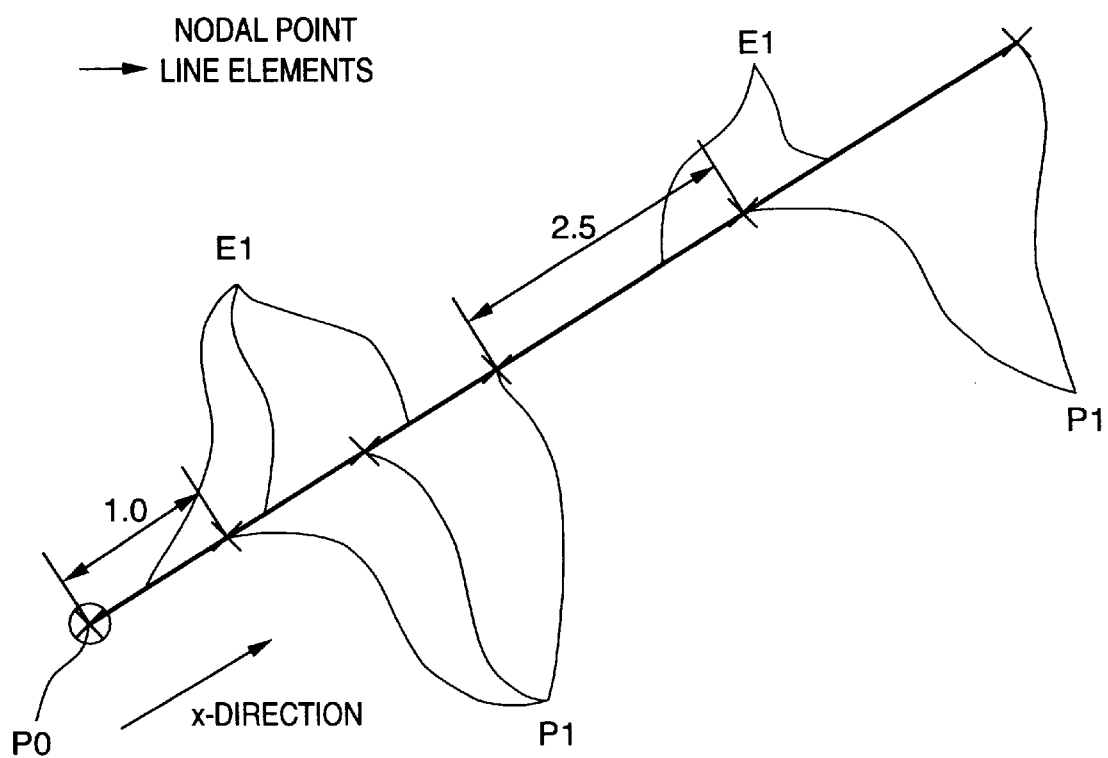
FIG. 7 is an explanatory view showing extension of a nodal point in the data input apparatus of the third embodiment.

Next, processing procedure of the apparatus of the third embodiment in a case shown in FIG. 7 where five line elements E1 are generated by extending a nodal point P0 will be described.

In this example, the five line elements E1 are generated by extending the nodal point P0 with an extension pitch "1.0" in the x-direction thrice, then extending the nodal point with an extension pitch "2.5" in the same direction twice.

(1) New Registration of Instruction

First, an operator designates the button 506 to change the registration screen in "new registration" mode (FIG. 6A). Then, similar to the first embodiment, the operator sets parameters of the extending direction (x-direction), the extension pitch (1.0) and the number of times of extensions (3) on the display screen, and designates the "registration" button 505. This operation displays the following on the editing window 310 in FIG. 4B:

(1.0, 0.0, 0.0)|1.0*3|

(2) Additional Registration of Instruction

The operator designates the button 506 to change the registration screen to "additional registration" mode (FIG. 6B). At this time, the apparatus of the third embodiment once reads the text data which stores data concerning to the instruction and reads the vector value of the extending direction, and converts the read data into text data to be displayed as label widgets 507. Next, as shown in FIG. 6B, the extension pitch and the number of extensions are changed in accordance with numerical values (extension pitch: 2.5, number of extensions: 2) input by an operator. Then, the operator designates the "registration" button 505 again. This operation displays set values in the editing screen image as shown in FIG. 6C. That is, when the "registration" button 505 is designated, the instruction added new parameters is registered in text file. Then, the text file is read and displayed on the editing screen, in this case, the added parameters (2.5*2|) are added at the end of the read data, and displayed in the editing window 510. Note that the displayed parameters of the editing window 510 indicate extension with an extension pitch "1.0" thrice in the x-direction (1.0*3), and extension with an extension pitch "2.5" twice (2.5*2).

(3) Execution of Instruction

As the above operation has been completed, the operator presses the "execute" button 512. Then, similar to the first embodiment, the apparatus of the third embodiment sends text data indicative of the instruction to the execution unit 103. The execution unit 103 interprets the instruction and perform corresponding processing. To perform a plurality of processings with respect to one registered instruction is realized by programming of the execution unit 103, and this can be attained without any problem.

The operation where two processings are performed from one registered instruction is as described above. There is no limitation to the number of additional instructions or parameters, accordingly, it is possible to add more additional instructions or parameters and perform complicated processings at once. In this example, additional registration is made using the additional registration screen, however, this may be made by directly inputting data on the editing window 510.

In the third embodiment, the number of the registration unit 100 and that of the editing unit 101 are respectively one, however, the first embodiment may be combined with the second embodiment providing the plurality of registration units 101 and the plurality of editing units 101. This produces advantages from the combination of the two embodiments.

As described above, according to the present invention, processing(s) can be performed in an interactive manner, thus excellent user interface is provided. As a result, in comparison with the conventional batch-processing type input-output devices, operability, operation efficiency and reliability of operation are greatly improved. In addition, complicated processing can be performed.

Further, in comparison with the conventional interactive-processing type input-output devices, the present invention has the following advantages:

(1) As an instruction is once registered then executed, a modified instruction of the registered instruction can be executed with the minimum operation (correction of text).

(2) As data constructing an instruction is registered in one instruction unit, a portion to be corrected can be easily found.

(3) The number of desired instructions to be registered can be increased. Regarding a plurality of instructions, re-execution of the respective instructions can be easily made to perform a desired processing.

(4) As undesired instruction(s) can be omitted, a desired processing can be easily performed by using desired instructions.

(5) A plurality of processings can be performed by registering one instruction. Accordingly, complicated processing can be performed by using a less numbers of instructions.

(6) In comparison with the conventional interactive-processing type input-output devices, operation efficiency is greatly improved. Thus, processing of a partitioning model can be very easily performed in short processing time.

Note that the first to third embodiments are separately described, however, these embodiments may be combined arbitrarily. The structure of the apparatus according to the second and third embodiments is the same as that in the first embodiment and the procedure in the second and third embodiments is performed by the procedure shown as the flowchart in FIG. 3.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

The present invention is not limited to the above embodiments and various changes and modifications can be made within the spirit and scope of the present invention. Therefore, to apprise the public of the scope of the present invention, the following claims are made.

What is claimed is:

1. An information processing apparatus comprising:

a display unit for displaying on a display screen a plurality of data-input windows each of which is assigned to an item of text data for defining each of a plurality of parameters to be input, the plurality of parameters being parameters for generating command data;

an input unit for inputting the parameters into the corresponding data-input windows;

generation means for generating command data corresponding to the parameters input into the data-input windows by said input unit, in accordance with the item of text data assigned to the data-input window into which each parameter has been input;

storage means for storing the command data generated by said generation means;

reading means for reading the command data from said storage means;

display control means for controlling said display unit to display on the display screen the command data read by said reading means as text data;

editing means for editing the text data displayed on the display screen; and execution means for executing the command data corresponding to the text data.

2. The information processing apparatus according to claim 1, wherein the command data comprises a string of text data.

3. The information processing apparatus according to claim 1, wherein said editing means has adding means for adding parameters to the command data displayed on the display screen in accordance with an instruction from an operator.

4. The information processing apparatus according to claim 1, wherein the parameters input into the data-input windows by said input unit include items regarding a direction for extending a nodal point, a unit length and a number of times of extensions.

5. A data input method for use in an information processing apparatus which inputs data and processes the input data, comprising the steps of:

displaying on a display monitor a plurality of data-input windows each of which is assigned to an item of text data for defining each of a plurality of parameters to be input, the plurality of parameters being parameters for generating command data;

generating command data corresponding to the parameters which have been input into the plurality of data-input windows, in accordance with the item of text data assigned to the data-input window into which each parameter has been input;

storing the command data into a memory;

reading out the command data from the memory;

displaying on the display monitor the command data read in the reading step as text data;

editing the text data displayed on the display monitor; and executing the command data corresponding to the text data.

6. The data input method according to claim 5, wherein the command data comprises a string of text data.

7. The data input method according to claim 5, wherein said editing step includes adding an instruction to the command data, displayed in said displaying step, in accordance with an instruction input by an operator.

8. The data input method according to claim 5, wherein the data input in the data-input window includes items regarding a direction for extending a nodal point, a unit length and a number of items of extensions.

9. The data input method according to claim 5, wherein numerical data are input into the data-input window.

10. A storage medium storing executable code comprising:

a display module for displaying on a display monitor a plurality of data-input windows each of which is assigned to an item of text data for defining each of a plurality of parameters to be input, the plurality of parameters being parameters for generating command data;

a generation module for generating command data corresponding to the parameters which have been input into the data-input windows, in accordance with the item of text data assigned to the data-input window into which each parameter has been input;

a storing module for storing the command data into a memory;

a reading module for reading out the command data from the memory;

a display module for displaying on the display monitor the command data read in the reading step;

an editing module for editing the text data displayed on the display monitor; and an execution module for executing the command data corresponding to the text data.

11. An information processing apparatus which loads the control program from the storage medium in claim 10, for executing control corresponding to the control program.

12. The storage medium according to claim 10, wherein the command data comprises a string of text data.

13. The storage medium according to claim 10, wherein said editing module includes an adding module for adding an instruction to the command data, displayed by execution of said display module, in accordance with an instruction input by an operator.

14. The storage medium according to claim 10, wherein the data input in the data-input window includes items regarding a direction for extending a nodal point, a unit length and a number of items of extensions.

* * * * *